United States Patent Office 3,475,115
Patented Oct. 28, 1969

3,475,115
METHOD OF CARRYING OUT REACTIONS USING LIQUID HEAT TRANSFER AGENTS
Winfried Glass, Essen, and Anton Benning, Essen-Heisingen, Germany, assignors to Bergwerksverband G.m.b.H., Essen, Germany
No Drawing. Continuation-in-part of application Ser. No. 201,326, June 11, 1962. This application Aug. 20, 1964, Ser. No. 391,041
Claims priority, application Germany, June 12, 1961, B 62,863
Int. Cl. C09k 3/02; C07c 15/12
U.S. Cl. 23—1       6 Claims

ABSTRACT OF THE DISCLOSURE

The process of transefrring heat from a body of one temperature to another body at a different temperature by circulating in heat exchange contact with one body and then in heat exchange contact with the other body dixylyltoluene or dibenzyltoluene.

---

This application is a continuation-in-part of our co-pending application Ser. No. 201,326, filed June 11, 1962, for "Heat Transfer Agent," now abandoned.

The present invention relates to methods of carrying out reactions using liquid heat transfer agents, and more particularly to the carrying out of reactions with a heat transfer agent which is liquid and remains liquid over a considerable range of temperature.

In the chemical arts many reactions are carried out requiring heat, wherein, however, a direct heating, for example by means of an open flame, is too dangerous or wherein it is desired to maintain a substantially constant temperature because of the sensitivity of the reacting substances. In such cases there is generally used an indirect heating by means of a liquid heat transfer agent.

A great number of such heat transfer agents are oils which have sufficiently satisfactory properties with respect to temperature stability and neutrality. It is of considerable advantage if the heat transfer agent remains liquid at the lowest possible temperature so that an installation or apparatus filled with the same can either remain or be used even in cool weather. Moreover, it is desirable if the vapor pressure of the heat transfer agent is as low as possible up to high temperatures so that it is possible to work with them at high temperatures without the use of pressure.

The boiling point of the known heat transfer agents in general is in the region of about 300° C., some of the agents having a boiling point above 400° C. However, these latter agents are not liquid at room temperature.

It is a primary object of the present invention to provide new heat transfer agents which meet all of the desiderata for liquid heat transfer agents.

It is another object of the present invention to provide new heat transfer agents which at atmospheric pressure boil close to or above about 400° C., and which are liquid without being viscous at room temperautre and even substantially below room temperature.

It is still another object of the present invention to provide for the use of such liquid heat transfer agents in carrying out reactions, and particularly in carrying out reactions under normal pressure.

Other objects and advantages of the present invention will be apparent from a further reading of the specification and of the appended claims.

With the above and other objects in view, the present invention comprises the use of a compound of the formula:

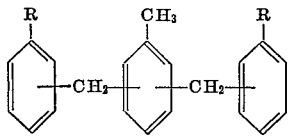

wherein R is selected from the group consisting of hydrogen and methyl as a heat transfer agent in carrying out a reaction requiring a heat exchange medium, and particularly in carrying out such reaction under normal pressure.

The method of the present invention mainly comprises carrying out a reaction utilizing a liquid heat transfer agent of the above formula for the transfer of heat from a heat source to the reaction mass in order to avoid direct contact of the heat source with a reaction mass, and carrying out the reaction at a temperature between the solidification point temperature and the decomposition temperature of the compound of the above formula.

Thus, in accordance with the present invention, dixylyltoluene of the formula:

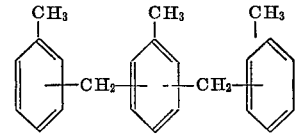

can be used as a heat transfer agent, or dibenzyltoluenes (in isomeric mixture) of the formula:

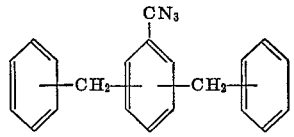

can be used as liquid heat transfer agent.

Dixylyltoluene is an oil which even at room temperature is relatively thinly liquid although the same has a boiling point of about 400° C. Dixylyltoluene is practically not at all decomposed up to the boiling point thereof and is consequently suitable for use as a heat transfer agent in a wide range of reactions.

Dixylyltoluene can be easily produced from inexpensive aromatics.

Thus, for example, dixylyltoluene can be obtained by the condensation of aromatic hydrocarbons, for example toluene, with formaldehyde or paraformaldehyde in the presence of sulfuric acid or another suitable condensation agent. It is also possible to produce dixylyltoluene by first chloromethylating toluene and then condensing the formed chloromethyltoluene with toluene in the presence of a Friedel-Crafts catalyst such as aluminum chloride. This condensation can also be carried out in the absence of a catalyst.

According to still another method ditolylmethane is first produced and the latter is condensed with chloromethyltoluene to dixylyltoluene. Many methods are known for the production of ditolylmethane, and such methods are described in the work of F. Glaser and H. Dahmen, in Chemiker-Zeitung 81, pages 822–826 (1957).

The dixylyltoluene of the present invention can be used for all known processes using heat transfer agents wherein without the use of pressure a temperature of up to 400° C. is desired. The compound can also be used for temperatures above 400° C. by operation under increased pressure.

Because of its low solidification point of about −17° C. the dixylyltoluene of the present invention remains liquid at well below the freezing point of water. With this oil the used heat exchanger can at any time be closed down and then again used.

The dixylyltoluene is particularly suitable as heat exchanger in apparatus which is exposed to a high degree of radiation, for example in atom reactors. Because of its predominant aromatic structure it is hardly at all attacked by irradiation with neutrons and gamma rays. An irradiation intensity of for example $3.6–10^{16}$ nuetons/cm.$^2$ per sec. and a gamma dose of $10^{18}$ roentgens results in no changes.

The dibenzyltoluene which is used as the heat transfer agent according to the present invention is an oil which even below room temperature is relatively thinly liquid although it has a boiling point of about 380° C. Its pour point is −34° C. Dibenzyltoluene is practically not at all decomposed up to its boiling point and is consequently suitable for use as heat transfer agent in a wide range of reactions.

Dibenzyltoluene can be easily produced from inexpensive aromatic compounds.

Thus, for example, dibenzyltoluenes can be obtained by chlorinating toluene and then condensing the formed benzylchloride with toluene in the presence of a Friedel-Crafts catalyst such as aluminum chloride. This condensation can be also carried out in the absence of a catalyst.

The dibenzyltoluene (isomeric mixture) of the present invention can be used for all known processes using heat transfer agents wherein at normal pressure a temperature of up to 380° C. is desired. The compound can also be used for temperatures above 380° C. by operation under increased pressure.

Because of its low solidification point of about −34° C. the dibenzyltoluene of the present invention remains liquid at well below the freezing point of water. With this oil the used heat exchanger can at any time be closed down and then again used.

Like dixylyltoluene, the dibenzyltoluene is particularly suitable as heat exchanger in apparatus which is exposed to a high degree of radiation, for example in atomic reactors. Because of its predominantly aromatic structure it is very little attacked by irradiation with neutrons and gamma rays. An irradiation intensity of for example $3.6–10^{16}$ neutrons/cm.$^2$ per sec. and a gamma dose of $10^{18}$ roentgens results in no changes.

It is also possible by the addition of viscosity-improving and age-improving agents to achieve a further modification of the liquid heat transfer agents of the present invention.

The following examples are given to further illustrate the production and use of the liquid heat transfer agents of the present invention. The scope of the invention is not, however, meant to be limited to the specific details of the examples.

EXAMPLE 1

900 parts by weight of toluene are cooked under refluxing with 1400 parts by weight of chloromethyltoluene until hydrogen chloride is no longer evolved.

The chlorine-free product is freed of excess toluene by distillation, whereby 460 parts by weight of toluene are reobtained. The remaining 1500 parts by weight of the condensed liquid are fractionated under reduced pressure. After distilling off a first run of 500 parts by weight of a still relatively low boiling liquid there is obtained by further fractionation 330 parts by weight of an oil which boils at normal pressure at between 350 and 400° C. This oil has the following structure:

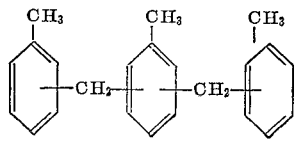

and the following characteristics:

| Appearance | Slightly yellowish, strong blue fluorescence. |
|---|---|
| Molecular weight | 300. |
| Boiling point | 406° C. at 760 mm. Hg; 285° C. at 40 mm. Hg. |
| Density: 20° | 1.025. |
| Flash point | ° C__ 313 |
| Solidification point | ° C__ −17 |
| Viscosity at: | |
| 20° C. | cst__ 204 |
| 50° C. | cst__ 28 |
| 100° C. | cst__ 4.7 |
| 150° C. | cst__ 1.76 |

This heat exchange oil can be used for the heating of a fluidized bed reactor for the esterification of finely powdered terephthalic acid with methanol, as well as for heating the screw for the introduction of the terephthalic acid and the heater for the methanol. The temperature of such reaction amounts to about 350° C. The heating of the heat exchanger liquid is carried out with an electrical recirculating heater driven by a pump from which the oil leaves at a temperature of about 370° C. After several hundred hours of running the conduit tubes of the oil oven exhibit substantially no precipitated material. Testing of the introduced oil shows that no changes of its properties occurred during the running time.

If instead of the dixylyltoluene of the present invention the apparatus has been filled with a known heat conducting oil, namely "Mobiltherm 600" it would not be possible to heat the reactor to a temperature of more than 300° C. The reason is that at somewhat higher temperatures of about 310° C. to which the oil is directly brought in the electrical heater the oil already starts to boil. Furthermore, after an equally long running time at 300° C. the heating tube exhibits several millimeter thick layer of soot which separated out from the oil, so that for the duration for which the dixylyltoluene of the present invention can easily be used it would not even be possible to use the known product under pressure.

EXAMPLE 2

Toluene is chloromethylated at 70° C. by means of hydrogen chloride and paraldehyde, and the formed chloromethyltoluene is heated with double the amount by weight of toluene in the presence of aluminum chloride as catalyst. After separation from the oily aluminum complex compound the reaction mixture is distilled. Besides excess toluene and a first run fraction there is obtained dixylyltoluene as an oily liquid that boils at between 350 and 400° C., and with respect to its properties is substantially identical with the product of Example 1. The yield amounts to 84% of the theoretical, calculated with respect to the starting chloromethyltoluene.

EXAMPLE 3

A mixture of 1000 parts of 70% sulfuric acid, 200 parts of 37% Formalin solution, 920 parts of toluene and 217 parts of ditolylmethane are slowly heated to 80° C. during 3 hours. It is heated an additional 30 minutes, then permitted to cool and the organic phase is separated from the aqueous phase. There is thus obtained 245 parts of a crude product which upon distillation results in the following fractions:

995 parts of excess, not reacted toluene,
217 parts of ditolylmethane (boiling range: 250–300° C.),
42 parts of dixylyltoluene (boiling range: 350–400° C.),
91 parts of higher condensed residue.

The ditolylmethane is used for further reaction. The dixylyltoluene has the same properties as the oily compound of Example 1.

EXAMPLE 4

Toluene is chloriated by chlorine until 15% chlorination. The mixture consisting of benzychloride and toluene is condensed in the presence of aluminum chloride by heating under reflux. After separating the oily aluminum complex compound, the reaction mixture is distilled. Besides excess toluene and a first fraction, dibenzyltoluene is recovered as isomeric mixture which possesses the following properties:

| | |
|---|---|
| Appearance | Colorless liquid |
| Boiling point °C | 380 |
| Pour point °C | −34 |
| Density (20) | 1.030 |
| Flash point °C | 204 |
| Viscosity (20) cp | 35.25 |
| Viscosity (50) cp | 13.0 |

The product shows an excellent viscosity behaviour even in the range of 0° C. The excess toluene as well as the oily phase are recycled to the process. The yield then amounts to 84% of the theory, related to converted toluene.

The heat exchange oil can be used for the heating of a fluidized bed reactor for the esterification of finely powdered terephthalic acid with methanol, as well as for heating the screw for the introduction of the terephthalic acid and the heater for the methanol. The temperature of such reaction amounts to about 350° C. The heating of the heat exchanger liquid is carried out with an electrical recirculating heater driven by a pump from which the oil leaves at a temperature of about 370° C. After several hundred hours of running the conduit tubes of the oil oven exhibit substantially no precipitated material. Testing of the introduced oil shows that no changes of its properties occurred during the running time.

EXAMPLE 5

1300 parts by weight of toluene are mixed with 320 parts by weight of benzylchloride and the solution is heated to boiling. After about three hours the solution is chlorine-free and may be decomposed in its fractions. The distillation of this charge renders:

| | Parts by wt. |
|---|---|
| Toluene | 1112 |
| Benzyltoluene | 328 |
| Dibenzyltoluene | 77 |
| Residue | 11 |

The dibenzyltoluene is identical with that described in Example 4.

By further charges the recovered toluene and the formed benzyltoluene are converted together with further benzylchloride. A yield of dibenzyltoluene of 90% is obtained by this manner.

EXAMPLE 6

Naphthalene is catalytically oxidized to o-phthalic acid. This reaction results in the release from the contact oven of a reaction gas with a temperature of about 550° C. This reaction gas is passed through a heat exchanger operating with dixylyltoluene, in which the heat exchange oil is passed through the tube of the heat exchanger by pumping at such speed that it remains at below the boiling temperature of about 400° C. By means of the heated oil the material to be introduced into the contact oven is heated until almost its reaction temperature. There is achieved by means of the dixylyltoluene a heat exchange at about 400° C. without the use of pressure resistant heat exchange apparatus.

Napthalene is catalytically oxidized to o-phthalic acid. This reaction results in the release from the contact oven of a reaction gas with a temperature of about 550° C. This reaction gas is passed through a heat exchanger operating with the benzyltoluene, in which the heat exchange oil is passed through the tube of the heat exchanger by pumping at such speed that it remains at below the boiling temperature of about 380° C. By means of the heated oil the material to be introduced into the contact oven is heated almost until its reaction temperature. There is achieved by means of the dibenzyltoluene as heat exchange at about 380° C. without the use of pressure-resistant heat exchange apparatus.

Without further analysis, the foregoing will so fully reveal the gist of the present invention that others can by applying current knowledge readily adapt it for various applications without omitting features that, from the standpoint of prior art, fairly constitute essential characteristics of the generic aspects of this invention and, therefore, such adaptations should and are intended to be comprehended within the meaning and range of equivalence of the following claims.

What is claimed as new and desired to be secured by Letters Patent is:

1. In a method of carrying out a reaction utilizing a liquid heat transfer agent for the transfer of heat from a heat source to the reaction mass in order to avoid direct contact of the heat source with the reaction mass, the improvement which comprises utilizing a liquid heat transfer agent consisting essentially of a compound of the formula:

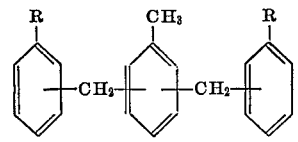

wherein R is selected from the group consisting of hydrogen and methyl as the heat transfer agent and carrying out said reaction at a temperature between the solidification point temperature and the decomposition temperature of said compound.

2. In a method of carrying out a reaction at atmospheric pressure at a temperature up to about 400° C. utilizing a liquid heat transfer agent for the transfer of heat from a heat source to the reaction mass in order to avoid direct contact of the heat source with the reaction mass, the improvement which comprises utilizing a liquid heat transfer agent consisting essentially of dixylyltoluene and carrying out said reaction at a temperature between the solidification point temperature and the decomposition temperature of said dixylyltoluene.

3. In a method of carrying out a reaction at atmospheric pressure at a temperature up to about 380° C. utilizing a liquid heat transfer agent for the transfer of heat from a heat source to the reaction mass in order to avoid direct contact of the heat source with the reaction mass, the improvement which comprises utilizing a liquid heat transfer agent consisting essentially of dibenzyltoluene as the heat transfer agent and carrying out said reaction at a temperature between the solidification point temperature and the decomposition temperature of said dibenzyltoluene.

4. The process of transferring heat from a body of one temperature to another body at a different temperature which comprises circulating in heat exchange contact with one body and then in heat exchange contact with the other body a liquid heat transfer agent consisting essentially of a compound of the formula:

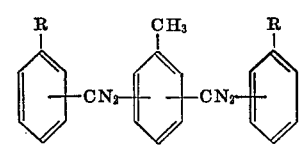

wherein R is selected from the group consisting of hydrogen and methyl at a temperature between the solidification point temperature and the decomposition temperature of said compound.

5. The process of claim 4, wherein said compound is dixylyltoluene.

6. The process of claim 4, wherein said compound is dibenzyltoluene.

References Cited

UNITED STATES PATENTS 2,933,450  4/1960  Lyding _____ 252—73
3,043,886  7/1962  Serres et al.

FOREIGN PATENTS 354,886  7/1931  Great Britain.
822,163  10/1956  Great Britain.

EDWARD J. MEROS, Primary Examiner

U.S. Cl. X.R.

176—92; 252—73